Dec. 17, 1957 — L. LEHR — 2,816,777

IMPLEMENT HITCH

Filed May 7, 1957

INVENTOR.
LEO LEHR

BY Theodore H. Lassogne
ATTORNEY

United States Patent Office 2,816,777
Patented Dec. 17, 1957

2,816,777
IMPLEMENT HITCH

Leo Lehr, Bakersfield, Calif., assignor to Lehr Brothers, Bakersfield, Calif., a copartnership Application May 7, 1957, Serial No. 657,662

3 Claims. (Cl. 280—456)

The present invention relates to improvements in tractor and earth engaging implement assemblies, and more particularly to a draft connection between a tractor and an implement drawn thereby embodying hydraulically actuated means for shifting the point of draft connection laterally.

Previous designs of hydraulically actuated laterally adjustable draft connections have not been capable of maintaining the point of connection of the tractor with the drawn implement at a fixed position under the changing lateral stresses and strains encountered in the use of such devices. This is because they have been designed so that these changing lateral stresses and strains are transmitted, substantially undiminished, to the hydraulic system. Under such circumstances, yielding of the walls of the hydraulic hose or the presence of a small amount of air entrained in the hydraulic system, or both, has been sufficient to permit the connection point to move substantially as the coupled vehicles are driven along. This is undesirable where a fixed position of adjustment is an objective. With tractor drawn implements, such as planters, in particular, it is important that the drawn implement, when in operation, be kept in fixed alignment with the point of draft application, usually offset with respect to the median line of the tractor.

The primary object of the present invention is to provide a hydraulic form of lateral adjustment for the point of draft application on a tractor drawn implement which will be substantially rigid with respect to lateral give or wobble. Other objects are to provide easy control from a station on the rear end or platform of a tractor and to provide a simple and efficient draft adjusting, or shifting, mechanism of a non-yielding type.

The foregoing advantages have been attained by providing a form of shifting mechanism employing a beveled cross-head on the implement draft tongue which cooperates with wedge-shaped thrust pistons to effect its lateral adjustment. The hydraulic power source on a tractor is preferably employed to actuate the respective pistons relatively in opposite directions through a control valve on the tractor and hydraulic rams on the draft tongue. The cross-head can thus be forced laterally in each direction and securely held in selected position on the draft frame of the implement to which it is slidably connected.

Figure 1:
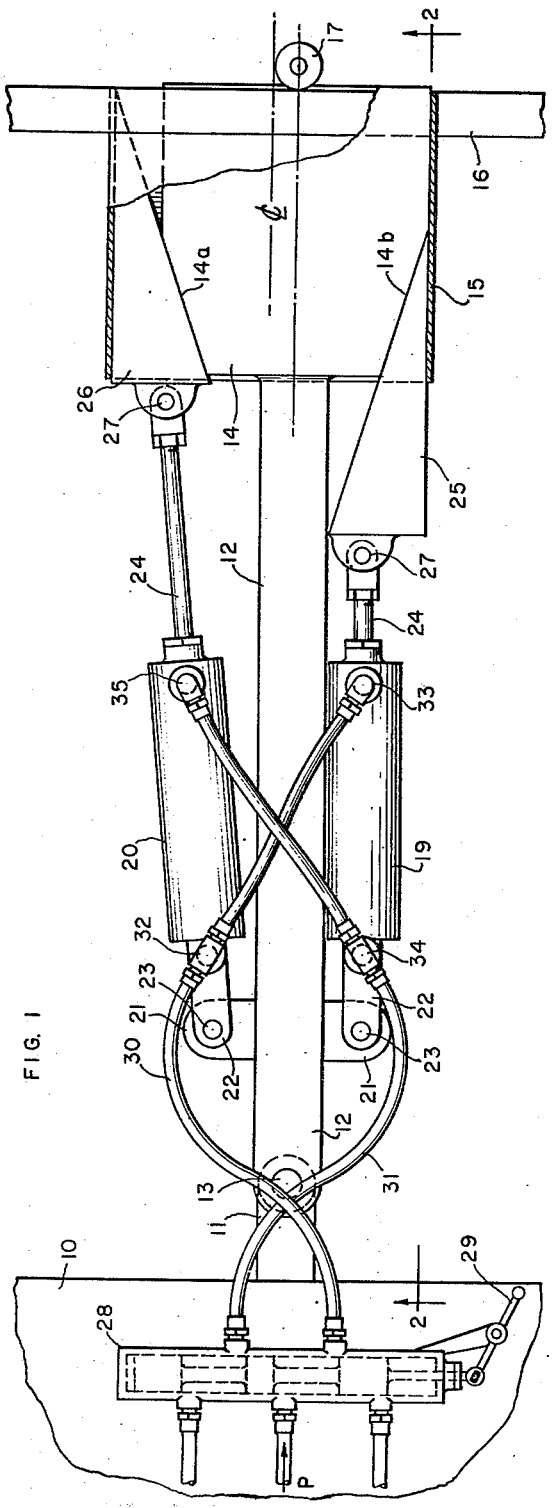
Figure 2:
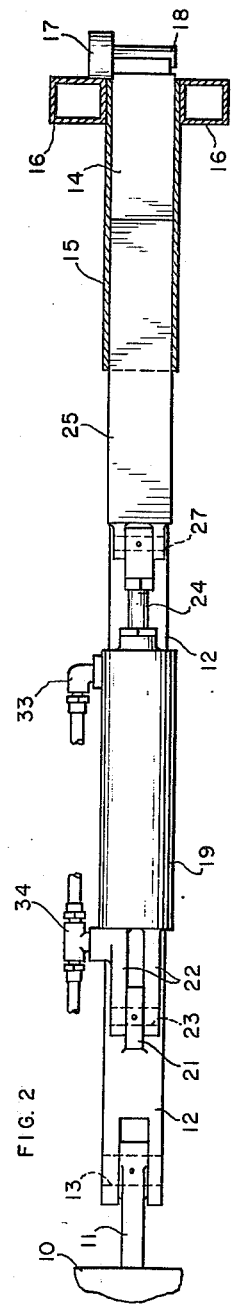

A preferred embodiment of the invention is hereinafter specifically described in conjunction with the accompanying drawing where:

Figure 1 is a plan view of a tractor-implement draft connection embodying the invention, including sectional portions of the tractor and the implement frame; and Figure 2 is a side elevation viewed on line 2—2 of Figure 1, with parts in section.

Referring to the drawing, 10 designates the rear platform or driver's station of a tractor and 11 the tractor draw-bar. The draft tongue 12 of an earth engaging machine or implement is pivoted at its front end to the tractor drawbar on a vertical axis at 13. Draft tongue 12 is provided at the rear end with a laterally extended, flat cross-head 14 formed with its opposite lateral edges beveled, as at 14a and 14b, on forwardly converging vertical planes. The cross-head 14 is contained in a flat piston box or housing 15 which is fixedly connected to and between the front transverse bars 16 of an implement draft frame. The housing 15 is wider than cross-head 14 and is designed to allow for lateral sliding movement of the cross-head therein. The cross-head transmits the draft pull to the housing 15 and frame members 16 by means of a movable point-of-draft application, or abutment, such as a roller 17 turning in a bearing 18 centrally mounted on the rear edge of the cross-head 14. The roller 17 will, therefore, move with the draft tongue and cross-head to shift the point of draft application laterally on the draft frame bars 16 and housing 15.

The means for shifting the draft tongue and cross-head preferably consists of two hydraulic rams 19, 20 pivotally mounted on opposite sides of the draft tongue 12 on opposite lugs 21, to which supporting arms 22 of the ram cylinders are pivotally connected as at 23. The piston of each ram has a pitman 24 connecting it to opposed wedge-shaped thrust pistons 25, 26, as through pivotal connections at 27. The thrust pistons are positioned with the inclined faces thereof corresponding to and contacting the beveled faces 14a, 14b of the cross-head 14 and are formed to fit and reciprocate in the spaces between the lateral edges of the cross-head and the side walls of the piston box or housing 15.

The rams 19, 20 are designed to be simultaneously actuated to force the wedge pistons 14a, 14b in opposite directions. This operation is made selective as to alteration and extent of movement desired by provision of a conventional two-way hydraulic valve 28 at the rear end of the tractor connected to the hydraulic system of the tractor and controlled by a hand lever 29 located within reach of the tractor's driver. The opposite pressure chambers of valve 28 are respectively in communication with the rams 19, 20, through pressure hose connections 30 and 31. Hose 30 communicates with the rear chamber of ram 20 through port 32 and front chamber of ram 19 through port 33. Hose 31 has similar, opposite, connections at ports 34, 35.

With the valve 28 shifted as indicated by the dotted lines, hydraulic pressure will be transmitted to force wedge piston 26 to extreme position within casing 15. Simultaneously, pressure applied to the opposite chamber of ram 19 causes withdrawal of wedge piston 25, as illustrated by Figure 1. Reversal of valve 28 will cause reversal of the action just described. Movement of valve 28 to an intermediate position will cause the parts to be held in any position to which they have been moved. Obviously, proper manipulation of valve 28 will cause more or less movement of the wedges as may be desired. As will be evident from the above description, the thrust of the wedge pistons will serve to shift the cross-head 14 and draft tongue 12 on the pivot connection to the tractor at 13. The roller 17, which constitutes the point of draft application, can accordingly be moved laterally as desired to shift the point of draft to either side of the central line as may be necessary to compensate for side draft, or to offset the implement being drawn with relation to the median line of the tractor.

The invention presents a simple, strong and easily operated draft line shift embodying a novel combination and arrangement of structural elements resulting in a form of adjustment which, though easily operated, will hold its adjusted position rigidly as against any lateral stresses or strains. This rigidity is due to the fact that the cross-head 14 is firmly held in position, at all adjustments, between the wedge pistons 14a, 14b. Any lateral thrust on the cross-head will be transmitted to one or the other of the wedges at approximately right angles and therefore without appreciable strain or pressure on the hydraulic lines, or other source of power that might be employed within the scope of the invention as defined in the claims.

What is claimed is:

1. In laterally shiftable draft mechanism, the combination with the rear portion and draw-bar of a tractor of a draft tongue pivoted at its forward end to said draw-bar on a vertical axis, a cross-head fixed to the rear end of the tongue and formed with forwardly converging vertical faces at opposite sides thereof, a laterally extended housing receiving the cross-head for lateral sliding movement therein, a transverse draft member secured to the rear edge of the housing, a draft abutment on the cross-head having laterally movable contact with the transverse draft member, opposite wedge-shaped thrust pistons longitudinally slidable within the housing against the opposite inclined faces of the cross-head, opposite hydraulic rams mounted on the draft tongue and having pitman connections with the respective wedge pistons, and a control valve on the tractor operatively connected to the respective rams for simultaneous opposite actuation, alternately, of the rams and pistons to shift the cross-head and draft abutment laterally with respect to the transverse draft member.

2. In laterally shiftable draft mechanism, the combination with the rear portion and draw-bar of a tractor of a draft tongue pivoted at its forward end to said draw-bar on a vertical axis, a cross-head fixed to the rear end of the tongue and formed with forwardly converging vertical faces at opposite sides thereof, a laterally extended housing receiving the cross-head for lateral sliding movement therein, a transverse draft member se- on the cross-head having laterally movable contact with the transverse draft member, opposite wedge-shaped thrust pistons longitudinally slidable within the housing against the opposite inclined faces of the cross-head, hydraulic actuating means on the draft tongue operable to cause simultaneous opposite movement of the thrust pistons, alternately against the cross-head, and means on the tractor for controlling said actuating means.

3. In laterally shiftable draft mechanism, the combination with the rear portion and draw-bar of a tractor of a draft tongue pivoted at its forward end to said draw-bar on a vertical axis, a cross-head fixed to the rear end of the tongue and formed with forwardly converging vertical faces at opposite sides thereof, a laterally extended housing receiving the cross-head for lateral sliding movement therein, a transverse draft member secured to the rear edge of the housing, a draft abutment on the cross-head having laterally movable contact with the transverse draft member, opposite wedge shaped thrust pistons longitudinally slidable within the housing against the opposite inclined faces of the cross-head, and means on the draft tongue for moving the thrust pistons simultaneously in opposite directions against the cross-head, thereby effecting lateral adjustment of the cross-head and draft abutment with respect to the housing and frame member.

No references cited.